United States Patent [19]
Miller et al.

[11] Patent Number: 5,987,577
[45] Date of Patent: Nov. 16, 1999

[54] DUAL WORD ENABLE METHOD AND APPARATUS FOR MEMORY ARRAYS

[75] Inventors: Christopher Paul Miller, Underhill, Vt.; Mark Beiley, Chandler, Ariz.

[73] Assignee: International Business Machines, Armonk, N.Y.

[21] Appl. No.: 08/842,523

[22] Filed: Apr. 24, 1997

[51] Int. Cl.[6] .................................................. G06F 12/00
[52] U.S. Cl. ........................ 711/168; 711/105; 711/111
[58] Field of Search .................................. 711/118, 104, 711/105, 143, 168, 111; 365/222, 189.04, 238.5, 230.03, 189.01, 200, 236, 233.5, 201

[56] References Cited

U.S. PATENT DOCUMENTS

| | | | |
|---|---|---|---|
| 4,596,004 | 6/1986 | Kaufman | 365/233 |
| 4,682,281 | 7/1987 | Woffinden et al. | 364/200 |
| 4,914,632 | 4/1990 | Fujishima et al. | 365/200 |
| 4,989,140 | 1/1991 | Nishimukai et al. | 364/200 |
| 5,018,061 | 5/1991 | Kishigami et al. | 364/200 |
| 5,136,700 | 8/1992 | Thacker | 395/400 |
| 5,179,679 | 1/1993 | Shoemaker | 395/425 |
| 5,185,719 | 2/1993 | Dhong et al. | 365/189.01 |
| 5,226,009 | 7/1993 | Arimoto | 365/189.04 |
| 5,241,641 | 8/1993 | Iwasa et al. | 395/425 |
| 5,297,091 | 3/1994 | Blake et al. | 365/203 |
| 5,319,766 | 6/1994 | Thaller et al. | 395/425 |
| 5,325,503 | 6/1994 | Stevens et al. | 395/425 |
| 5,359,722 | 10/1994 | Chan et al. | 395/425 |
| 5,369,753 | 11/1994 | Tipley | 395/425 |
| 5,469,559 | 11/1995 | Parks et al. | 711/106 |
| 5,625,790 | 4/1997 | Cutter | 711/104 |
| 5,715,206 | 2/1998 | Lee et al. | 365/222 |
| 5,841,712 | 11/1998 | Wendell et al. | 365/200 |

FOREIGN PATENT DOCUMENTS

| | | |
|---|---|---|
| 285 309 | 5/1988 | European Pat. Off. . |

OTHER PUBLICATIONS

"Integrated Controller with Fine-Tuned Memory Timings," *IBM Technical Disclosure Bulletin*, vol. 36, No. 9A, Sep. 1993, pp. 203–206.

*Primary Examiner*—John W. Cabeca
*Assistant Examiner*—Fred F. Tzeng
*Attorney, Agent, or Firm*—Robert A. Walsh

[57] ABSTRACT

A dual word enable method for memory data access includes the steps of: (i) providing a plurality of address data signals for addressing data stored in an array; (ii) issuing a first row access strobe (RAS) signal to decode the addressing data; and (iii) issuing a second row access strobe (RE2) signal for driving the address data into the memory array after determining that data is present in the memory array.

23 Claims, 3 Drawing Sheets

DUAL WORD ENABLE METHOD AND APPARATUS FOR MEMORY ARRAYS

BACKGROUND OF THE INVENTION

1. Field of the Invention

This invention relates generally to a cache memory system and, more particularly, to a dynamic random access memory used as a cache memory in a cache memory system and having an improved cache data access time.

2. Discussion of the Related Art

Historically, stand-alone dynamic random access memory (DRAM) chips begin an array access by the activation of a Row Address Strobe (RAS) signal. With reference now to FIG. 1, a block diagram of a standard stand-alone DRAM chip 10 is shown. DRAM chip 10 includes address buffers 12 for receiving address inputs 14 ($A_0$–$A_n$), a row pre-decoder 16, row drivers 18, a row redundancy decoder 20, redundant row drivers 22, a memory array or bank 24, and a sense amplifier and bit decoder 26. Sense amplifier and bit decoder circuit 26 is coupled to data I/O buffers 28. Data input/output (I/O) buffers 28 receive data on I/O lines 30 to be written into memory array 24. Data I/O buffers 28 further output data read from the memory array 24 on I/O lines 30. A read/write signal input (not shown) determines whether a read operation or a write operation is carried out.

Referring still to FIG. 1, DRAM chip 10 also includes a RAS input 32, buffer 34, Column Access Strobe (CAS) input 36, and buffer 38. Basic control signals for the standard stand-alone DRAM 10 include the RAS input 32, the CAS input 36, and address inputs 14. A RAS signal 32 is presented to the DRAM chip 10 once an appropriate memory control logic (not shown) has decided to access the array 24 of DRAM chip 10 in accordance with the row address and column address presented to the chip via address inputs 14. In the typical DRAM chip 10, an entire row access proceeds from the RAS signal 32. If an activation of a memory array access by the memory control logic circuit (not shown) was speculative and subsequently canceled, then an entire chip cycle time must pass before the chip 10 (i.e., array 24) can be accessed again.

In continuation of the above discussion, two things actually have to happen before accessing data in a DRAM array, i.e., to actually activate a wordline. First, the address is decoded down to a wordline or a group of wordlines. Then, an appropriate wordline driver or group of wordline drivers must be enabled. With typical DRAMs, the memory array is so dense, and there are so many rows and columns which make up so many total number of cells, that the likelihood of having a defective cell is high. Thus, a typical DRAM will have a small number of redundant rows and redundant columns. Most of the time, there are only a few defective rows in an array. In any case, accessing data in the DRAM array also includes looking at redundant decoder outputs. An additional function must be performed before activating a row driver after giving the row address. The input address must be checked to determine that it is not one of a defective row. In the event that the row address is one of a defective row, the redundant row decoder would need to recognize the address as a defective row. Basically, the redundant row decoder of the DRAM is programmed with the defective addresses when the DRAM part is manufactured. If the redundant row decoder detects a match with an incoming address, the redundant row decoder outputs a positive match signal and inhibits driving the wordline associated with the incoming address because it is known to be defective. The redundancy row decoder substitutes instead a redundant wordline. The redundant row driver receives the decoded redundant address and goes to a special section of the DRAM array that has just redundant rows.

In U.S. Pat. No. 5,469,559, Parks et al., assigned to DELL USA, of Austin, Tex., a method and apparatus for refreshing a selected portion of a dynamic random access memory of a computer is disclosed. The '559 DRAM subsystem includes a memory controller having a RAM device for storing a plurality of region descriptors used to inhibit the refresh of address ranges of the DRAM that do not contain valid data. Logic circuitry is connected between a refresh period timer and the RAM device for inhibiting receipt by a RAS generator of a refresh pulse when a generated refresh address falls within the refresh address range defined by the region descriptor. A refresh address output by a refresh address counter is compared to the region descriptors in the RAM device, and if the region descriptors indicate that the row addressed by the refresh address does not contain valid data, the RAS generator is inhibited from producing a RAS pulse. Logic instructions are inserted into memory allocation and memory deallocation subroutines of the computer's operating system for writing the region descriptors to the RAM device. Note that while the '559 discloses inhibiting a receipt of a refresh pulse by an RAS generator, the '559 patent does not provide an ability to terminate a DRAM access without suffering a full DRAM cycle time. The '559 patent is thus concerned with a way of gating the RAS signal (under certain circumstances) to the DRAM and controlling a timing of when a refresh operation is carried out. The '559 patent does not deal with accessing of information in the DRAM faster, that is, not related to DRAM performance.

A current direction in the industry is to merge DRAM with logic. For example, ways are being sought to use DRAM instead of SRAM, since DRAM is denser and less expensive to manufacture. One problem, however, is that the DRAM must be fast enough to enable SRAM to be replaced by DRAM.

DRAM array circuits considered for use in merged DRAM/logic applications can require a very high performance, especially when considered for use in place of a fast static random access memory (SRAM). In such an instance, when a conventional DRAM architecture is used in a DRAM/logic application, two problems arise. First, an abort of a DRAM access requires a full cycle before the DRAM can be accessed again. Second, performance is limited by requiring all row operations for access be performed in sequence based on the strobe signal RAS. In addition, the problem of allowing RAS to trigger a DRAM access cycle prematurely has always existed. A controller must either decide to speculatively access the memory and risk throwing away a full DRAM cycle (if the accessed address holds other data) or wait to begin an access until after the data is known to be present in the DRAM array.

With respect to the use and operation of a typical DRAM chip, according to known DRAM specifications, an address can be presented to the DRAM chip with respect to the RAS input for use in selecting a wordline or a group of wordlines of the DRAM chip's memory array. Typically, the address input is allowed to be presented to the DRAM chip as late as the receipt of the RAS strobe signal. The DRAM chip thus has a zero set up time once the RAS strobe is received. The address input can change up until the receipt of the RAS strobe. At receipt of the RAS strobe, the address input becomes valid and an array access occurs. Because valid address input information cannot be relied upon earlier than the occurrence of the RAS strobe, no operation can be performed by the conventional DRAM concerning the address input until receipt of the RAS strobe. The RAS strobe is the only indication to the conventional DRAM that the address input is valid. Any time before the occurrence of the RAS strobe, the address input is not guaranteed to be valid.

Furthermore, in a conventional memory system, a DRAM memory is not accessed until the memory controller has searched the DRAM tag array to determine if the desired data resides within the DRAM memory. Therefore, even though the address of the desired memory may be available, an access is not begun. If a memory controller searches the DRAM tag array and speculatively accesses the DRAM memory at the same time (i.e., issues the RAS strobe signal), then time to access data from DRAM memory is improved but at the cost of much worse DRAM memory availability. When a DRAM is accessed unsuccessfully because the DRAM tag array determines that the desired data is not in the DRAM memory, it costs many processor cycles before the DRAM memory array is next available to process another access request. As a result, in a hierarchical memory system where the cache has a ninety percent (90%) hit rate, unsuccessful accesses to the DRAM memory approach 90%, thus greatly diminishing DRAM memory availability and also wasting power.

A high speed cache application can be carried out using a memory hierarchy 50 including a processor 51 having a CPU 52 and a level 1 (L1) SRAM 54. Memory hierarchy 50 further includes a level 2 (L2) SRAM 56 and a level 3 (L3) DRAM 58, wherein the L3 DRAM is a conventional DRAM. See, for example, the memory hierarchy of FIG. 2. With the memory hierarchy of FIG. 2, when there is a request for data, the memory controller 60 will check to see if the requested data is in the SRAM 56 or DRAM 58 using appropriate tag arrays or region descriptors. If the requested data is in the L2 SRAM 56, then it is necessary to inhibit, interrupt, or prevent the access to the DRAM 58 to achieve a performance benefit as discussed herein. If the access to the DRAM 58 is not inhibited, then a wait of one complete DRAM access cycle is required before the respective prior art DRAM 58 is ready or available to be accessed again (i.e., for a next occurring access). Thus, at a minimum, a wait of one complete DRAM access cycle (i.e., on the order of 80–100 ns) or a wait of many processor cycles (i.e., on the order of many times 5 ns) may be required. As a result, the prior art DRAM 58 cannot allow the high speed cache application to operate the memory hierarchy system 50 at a highest optimal frequency.

Referring still to FIG. 2, when a cache memory controller 60 is given a request for data from a processor 51, the memory controller 60 first determines where the data resides. The cache memory controller 60 must check the region descriptors for the L2 cache 56 (i.e., SRAM) and the L3 cached DRAM 58. Often times, the memory controller 60 will check both places simultaneously. With respect to the SRAM 56, it takes less time to check to see if the requested data is in SRAM since the SRAM represents a much smaller address space, thus taking much less time to search. In other words, the region descriptors for data in SRAM are fewer than that of DRAM, thus searching happens more quickly with respect to the SRAM. In parallel, searching occurs with the region descriptors of DRAM 58. Because the memory controller 60 gets an answer as to whether the data is in SRAM 56 cache sooner, the memory controller 60 can then abort a speculative access to the DRAM 58. It is a disadvantage if such an abort occurs after an access to the DRAM memory has started because a full DRAM cycle must now be completed before a new memory access to the DRAM can begin.

In further discussion of the above, as mentioned, the memory controller 60 can determine if the requested data is in SRAM 56 while searching the descriptors of the DRAM 58. If it turns out that the SRAM 56 is a miss (i.e., not in the L2 cache) and the requested data address is in the region descriptor for the DRAM 58, then the memory controller 60 knows to go ahead and access the DRAM 58. Still further, if it turns out that the address ends up missing in the L2 cache 56 and it is also not in the region descriptor for the DRAM 58, the memory controller 60 will determine not to issue an access to the DRAM 58, since the requested data is not there. Instead, the controller 60 goes to a more complicated task of issuing a request for the data from some other location such as tape, hard drive or wherever it might be, but further up in the memory structure hierarchy.

Thus it is desirable to provide a DRAM for use in a high speed cache DRAM/logic application having an improved DRAM data access time, as well as enable the high speed cache application to operate at a highest optimal frequency.

SUMMARY OF THE INVENTION

It is an object of the present invention to achieve a performance improvement using a multiple row enable approach for a DRAM, and more particularly, a dual word enable.

In accordance with the present invention, a method for memory data access includes the steps of: (i) providing a plurality of address data signals for addressing data stored in an array; (ii) issuing a first row access strobe (RAS) signal to decode the addressing data for selecting a single wordline or set of wordlines; and (iii) issuing a second row access strobe (RE2) signal for driving the wordline or set of wordlines to access the memory array after determining that data is present in the memory array.

In further accordance with the present invention, a dual word enable DRAM includes a plurality of address inputs for receiving address data coupled to a plurality of address buffers. The address buffers are coupled to both a row pre-decode circuit and a row redundancy decode circuit. A row driver is coupled between the row pre-decode circuit and a DRAM memory array. A redundant row driver circuit is coupled between the row redundancy decode circuit and a redundant portion of the DRAM array. A sense amplifier (S/A) and bit decoder circuit is coupled to the DRAM array. The bit decoder circuit is coupled to a data I/O buffer. A first word enable input is provided for receiving a row address strobe (RAS) signal. The first word enable input is coupled to the address buffers, row pre-decode circuit and row redundancy decode circuit, wherein the RAS strobe signal is for gating an output of the address buffers, and enabling and gating the row pre-code circuit and row redundancy circuit. Lastly, a second word enable input is provided for receiving a second word enable signal RE2. The second word enable input is coupled to the sense amplifier and bit decoder, the row drivers, and the redundant row drivers, wherein the RE2 signal is for gating a respective output of the row drivers, the redundant row drivers, and the sense amplifier and bit decoder.

Still further, a cached dynamic random access memory (DRAM) integrated circuit (IC) optimized for obtaining a desired cache performance includes a dual word enable memory. Address buffers are provided for receiving address inputs and buffering the same, the address inputs corresponding to a particular row or set of rows of a memory array being addressed. A row pre-decoder receives the buffered address inputs and decodes the same. Row drivers are responsive to an output of the row pre-decoder for activating an addressed row or set of rows of the memory array. A row redundancy decoder is provided for receiving the buffered address inputs and redundantly decoding the same, as required for a particular array. In addition, redundant row drivers are responsive to an output of the row redundancy decoder for activating a redundant row of the memory array as required. A sense amplifier and bit decoder are provided for sensing and amplifying a desired bit from the addressed row of the memory array. A first word enable row address strobe (RAS) input is provided for receiving an RAS signal presented to the cached DRAM IC chip for initiating a first word enable portion of accessing the memory array. The RAS input is connected to the row pre-decoder, the row redundancy decoder and is further for gating a respective output of the same. Lastly, a second word enable input is provided for receiving a second word enable signal RE2 for initiating a second word enable portion of accessing the memory array. The second word enable input is coupled to the sense amplifier and bit decoder, the row drivers, and the redundant row drivers, wherein the RE2 signal is for gating a respective output of the row drivers, the redundant row drivers, and the sense amplifier and bit decoder. The row predecoder output signal (i.e., the row driver select signal) is available to the row driver and redundancy row driver via the row pre-decoder and the row redundancy decoder, respectively, during the first word enable portion prior to a determination that a requested data resides in the memory array of the second word enable portion. A method in accordance with the present invention is also described herein below.

BRIEF DESCRIPTION OF THE DRAWINGS

The foregoing and other teachings and advantages of the present invention will become more apparent upon a detailed description of the best mode for carrying out the invention as rendered below. In the description to follow, reference will be made to the accompanying drawings, where like reference numerals are used to identify like parts in the various views and in which.

DETAILED DESCRIPTION OF A PREFERRED EMBODIMENT OF THE INVENTION

In accordance with the present invention, a cached DRAM integrated circuit (IC) includes a highly optimized DRAM for obtaining a desired cache performance in terms of cache speed. In this regard, a non-standard design approach is used to create a unique circuit interface. A performance improvement is obtained in accordance with the embodiments of the present invention, to be discussed in further detail herein below.

Very often in cache memory systems, an address is valid quite a bit earlier than when an access occurs in a memory array. In accordance with the present invention, the cached DRAM IC includes a dual word enable DRAM. The dual word enable DRAM advantageously utilizes input address bits even though a cache memory system controller may not necessarily know that it does indeed want to access the DRAM. In the present invention, the dual word enable DRAM is well suited for use with an integrated L2 (second level) SRAM chip. The dual word enable DRAM of the present invention is characterized as a faster stand alone DRAM, having two row enable inputs (alternatively, dual word enable inputs) in that it takes advantage of address information even before accessing information in memory array of the DRAM. In the description to follow, the terms "row" and "word" are used interchangeably and are to be understood to convey the same meaning. For example, dual word enable and dual row enable have the same meaning. Other examples include row address or word address, and row decode or word decode, etc.

Figure 3:
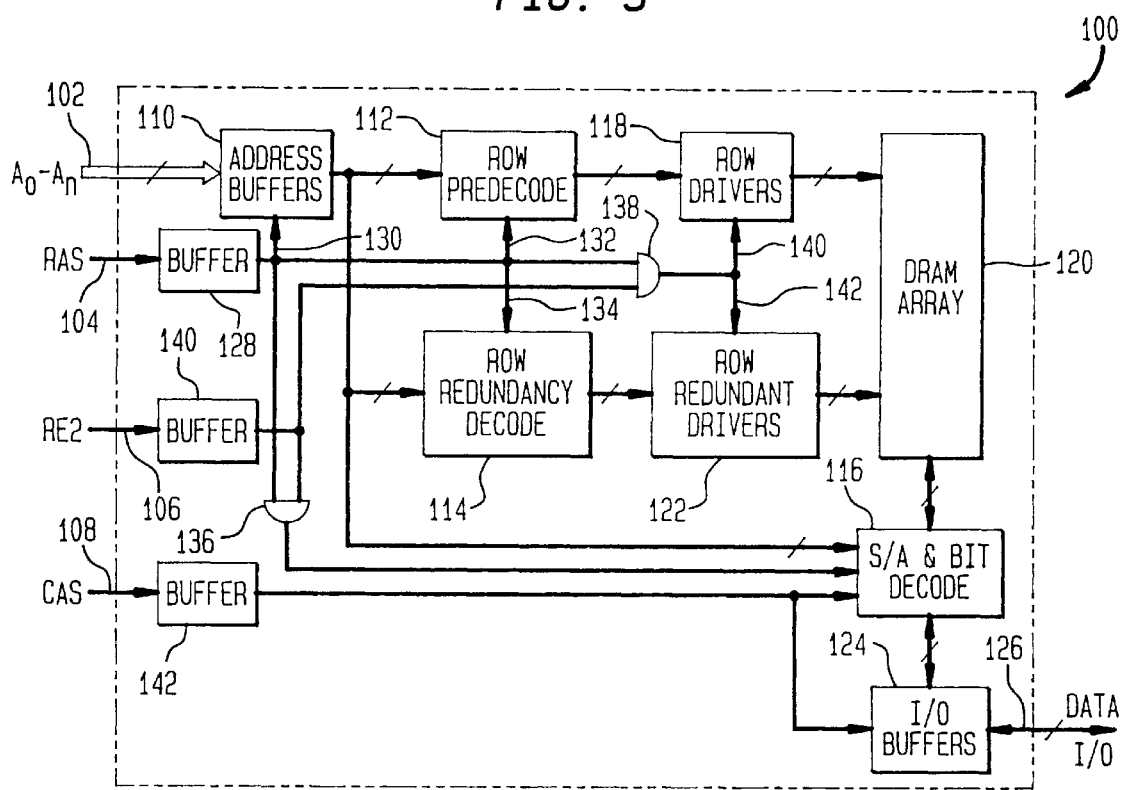
FIG. 3 shows a schematic representation of a stand-alone DRAM chip in accordance with a first embodiment of the present invention.
Figure 2:
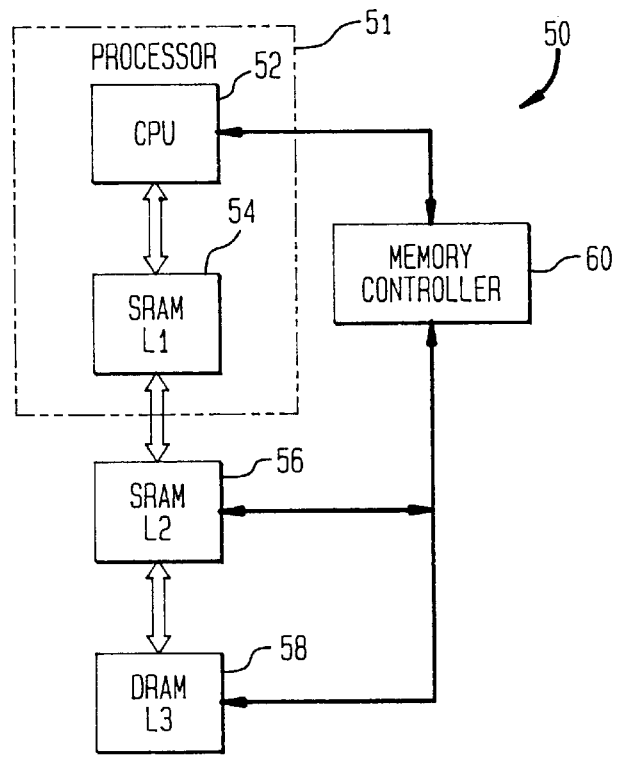
FIG. 2 illustrates a simplified schematic view of a cached memory system incorporating a conventional DRAM chip as a third level cache memory.

Turning now to FIG. 3, a DRAM 100 in accordance with the present invention includes a dual word enable architecture. The dual word enable architecture 100 includes address inputs 102, a RAS input 104, a RE2 input 106 (Row Enable #2) and a CAS input 108. The DRAM 100 of FIG. 3 is different from a conventional DRAM 100 as outlined below, particularly in that the DRAM according to the present invention includes two row enable control inputs RAS and RE2. While the dual word enable DRAM according to the present invention operates in some ways similar to a conventional DRAM, the present invention is an improvement over known DRAMs and not an obvious extension thereof.

Referring still to FIG. 3, DRAM 100 in accordance with the present invention further includes address buffers 110 for receiving address inputs $(A_0-A_n)$102. Buffered address inputs are provided to row precoder 112, row redundancy decoder 114, and sense amplifier and bit decoder 116. Row predecorder 112 is coupled to row drivers 118 which is coupled to memory array 120. Row redundancy decoder 114 is coupled to row redundant drivers 122 which is coupled to memory array 120. Sense amplifier and bit decoder 116 are coupled between memory array 120 and data I/O buffers 124. Data I/O buffers 124 provide output data read from the memory array 120 on I/O lines 126. Data I/O buffers 124 further receive data on I/O lines 126 to be written into memory array 120. A read/write signal input (not shown) determines whether a read operation or a write operation is carried out.

RAS input 104 is coupled to buffer 128, which is further coupled to a respective enable input of address buffers 110, row predecoder 112, and row redundancy decoder 114 at 130, 132 and 134, respectively. The buffered RAS input is further provided to logical AND gates 136 and 138. RE2 input 106 is coupled to buffer 140, which is further coupled to logical AND gates 136 and 138. A logical ANDing operation of the RAS input and the RE2 input is used to enable the row drivers 118 and row redundant drivers 122 via AND gate 138 at respective enable inputs 140, 142. In addition, the output of AND gate 136 is used to enable the sense amplifier and bit decoder 116. CAS input 108 is coupled to buffer 142 which is further coupled to sense amplifier and bit decoder 116 and to I/O buffers 124.

Figure 4:
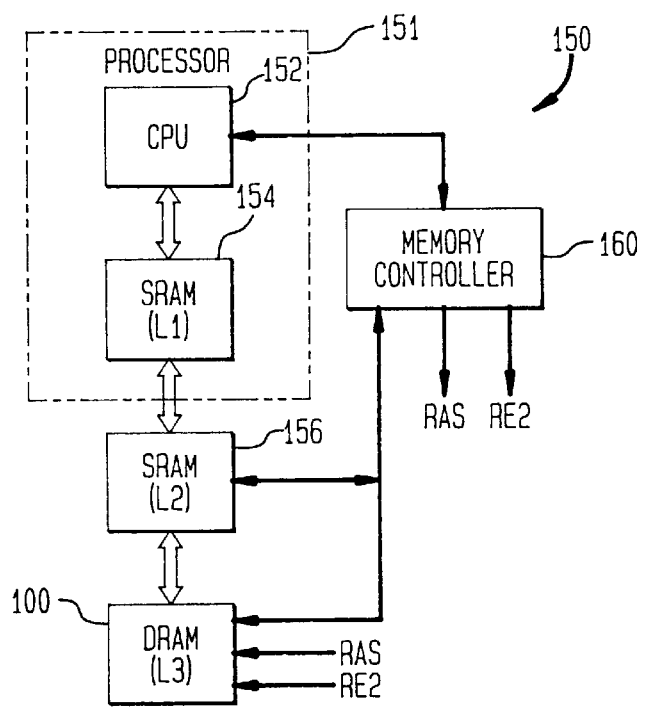
FIG. 4 illustrates a simplified schematic view of a cached memory system incorporating the stand-alone DRAM chip of the present invention as a third level cache memory.

The use of a DRAM is not typically found in cache applications in view of prohibitively large cycle time performance penalty when compared to static memory. While it is true that DRAM is not fast enough to be used as an L1 type of cache, DRAM is being used as an L2 cache memory element. The present invention is well suited for an integrated cache chip with on-chip DRAM, as well as a microprocessor core with on-chip DRAM. Performance and cycle time are difficult problems to over come when trying to use DRAM in high performance cache applications. In particular, the present invention is for use as an L3 (i.e., third level) memory in a cached memory system in which there are two faster static RAMs between the DRAM and the central processing unit (CPU) of the processor. The DRAM 100 in accordance with the present invention is thus referred to as a cache herein, however, the L3 memory position is not necessarily to be understood as a main memory position in a memory hierarchy. A memory hierarchy 150, as shown in FIG. 4, includes a processor 151 having a CPU 152 and a level 1 (L1) SRAM 154. Memory hierarchy 150 further includes a level 2 (L2) SRAM 156, a level 3 (L3) DRAM 100, and memory controller 160. Memory controller 160 includes a RAM device for storing a plurality of DRAM tag array or region descriptors. The region descriptors are used to determine, for example, if the contents of an input address are stored in the DRAM 100.

When the processor 151 requests data associated with an address from the memory controller 160, the controller 160 interrogates and L2 region descriptor and DRAM region descriptor. The memory controller 160 goes looking through an L2 region descriptor and a DRAM region descriptor and beyond, until finally the memory controller 160 finds where the data is located. As a result, the controller 160, given the requested address from the processor 151, actually is aware of what address the processor 151 is looking for the data of, even before the controller 160 knows where the data is. In accordance with the present invention, an intelligent controller presents this address to the DRAM 100 even before the controller 152 knows that the data is in the DRAM 100, thus enabling the DRAM 100 to use the address while the controller is waiting to find out from the region descriptor if in fact the data is in the DRAM 100. In the design of the present invention, the DRAM 100 can be integrated onto a single chip, with SRAM and logic circuitry which can result in a very small, high performance DRAM 100 in which access time of data out of the DRAM is on the order of about 20 ns or less. A very fast dual word enable DRAM 100 in accordance with the present invention can advantageously be used in place of an SRAM in particular cache memory applications.

In accordance with the present invention, the time saved by processing of an input address, before even driving a wordline in the DRAM array, involves more than a time savings for just decoding an intended row. The time saved also involves decoding whether or not an incoming address is one of a defective row and then substituting the redundant row driver in place of the row driver for the incoming address. With the present invention, a time savings has been determined to be on the order of two and a half to four nanoseconds (2.5–4 ns) of time for a particular technology. That is, the particular time savings would be different if the present invention were cast in different technologies. If you were to consider an off the shelf DRAM with an access time of 50 ns, the 2.5–4 ns time savings would amount to a time savings on the order of a little bit less than 10%. Such a percentage time savings may or may not be enough to warrant the kind of structural change as contemplated by the present invention. However, for very high speed DRAMs which run in the range of 10–20 ns, then 2.5 to 4 ns is a significant portion thereof. The dual word enable approach of the present invention may enable the elimination of an additional clock cycle of latency before the DRAM delivers data back to the system, i.e., in a system where the data is synchronized. In a synchronized system, if the data from an array is not available by one clock edge, then a wait of one whole clock period occurs before data can be provided back to the system. Therefore, even an improvement of a couple of nanoseconds can mean a significant improvement back to the processor, that is, in terms of getting data back to the processor for use in the computer system utilizing the dual word enable DRAM of the present invention. The dual word enable DRAM 100 according to the present invention thus advantageously provides an improved memory array data access time, as described above.

In accordance with the present invention, a first word enable signal via RAS input 104 controls the operation of decoding both the regular and the redundant wordline addresses of the regular and redundant wordlines (i.e., the rebuffering, decoding and the drive of the addresses). Controlling a wordline of an array access is achieved with a separate word enable control signal RE2 via RE2 input 106. In this manner then, speculatively, the DRAM 100 can begin to process the input address information without having committed itself to an accessing of the DRAM array 120. If it turns out that the region descriptor (i.e., the tag array) is a match for an incoming address, then the tag array is indicative that the data is present in the DRAM 100. When it is determined that the tag array or region descriptor for the DRAM 100 shows that the data is in fact in the DRAM 100, then an RE2 signal is issued by appropriate logic circuitry of the memory controller 160 and the DRAM 100 continues to process an access to the DRAM array 120 to get the corresponding data. However, instead of starting a new DRAM access from the beginning with a new address to obtain the corresponding data from the DRAM array 120, the DRAM access by the second word enable RE2 signal starts with a decoded wordline or redundant wordline and directly activates the appropriate driver. The DRAM access has advantageously obtained a head start with the first word enable RAS signal via RAS input 104. As a result, at least from the time the second word enable RE2 signal was issued, instead of waiting a full DRAM access, a wait on the order of a full DRAM access time minus the buffer and decode time results to a time savings on the order of 2.5 to 4 ns (nanoseconds).

The DRAM array access time performance improvement as discussed above, having nothing to do with refresh, uses two word enable inputs 104 and 106 to take advantage of early row addresses such that when a determination is made to finally go ahead and access the DRAM array 120, the data can be given back sooner than it would be otherwise. In addition, the dual word enable DRAM 100 having two row enable inputs 104 and 106 according to the present invention overcomes problems associated with normal and redundant array access. The present invention thus takes advantage of an early row address availability to enable providing of data back to a processor earlier than otherwise under particular circumstances as discussed above.

The present invention is further for reducing a cycle time in the event that a DRAM access is speculative. With the present invention, when the processor 151 requests data associated with an address, the controller 160 could speculatively access an SRAM 156 and at least start searching the tag array of the DRAM 100 in parallel. Because the memory controller 160 would have an answer as to whether or not the data was in the SRAM 156 in a relatively quick time, any unnecessary access to the DRAM 100 can be advantageously inhibited by not issuing the second word enable RE2 signal.

In accordance with the present invention, with DRAM 100, the buffering and decoding of the input address is started before a determination from the region descriptor has been made which is indicative of whether or not to access the wordline or group of wordlines of the DRAM array 120. Because the region descriptor controls a generation of the second word enable RE2 signal, a full access of the DRAM 100 does not occur until such determination. However, the dual word enable DRAM 100 of the present invention advantageously starts an early processing of the row addresses which advantageously saves time in the providing of data out of the DRAM 100 upon the determination that the requested data is in the DRAM 100.

Figure 1:
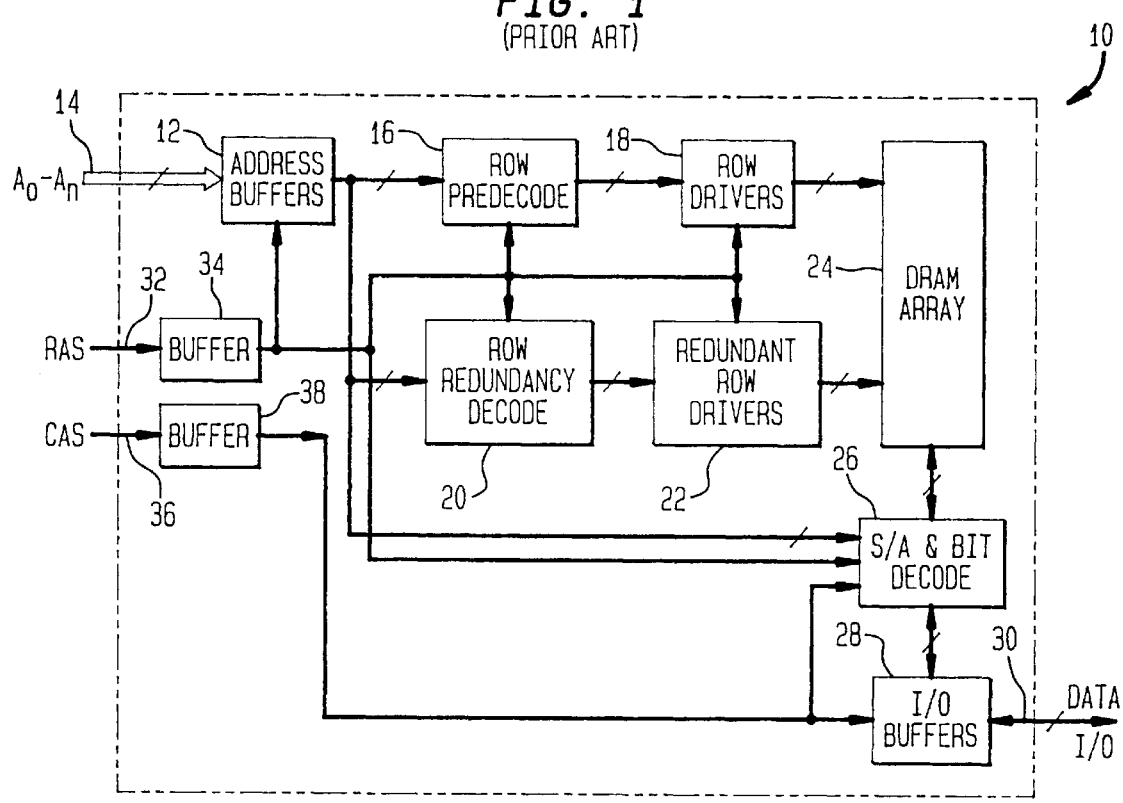
FIG. 1 shows a schematic representation of a standard standalone DRAM chip known in the art.

In a first situation, it may turn out that processing of the row addresses has started as a result of the receipt of the first word enable RAS signal or input 104, but the region descriptor indicates that the data isn't available in the DRAM 100 (i.e., the data does not reside in the DRAM). In this situation, the recovery time for having just accessed, using the first word enable RAS signal on input 104, the address decoding and redundant row decoding circuits 112 and 114, respectively, of the DRAM 100 is on the order of 6 ns or less. See, for example, the timing diagram of FIG. 5. This is in contrast to a system utilizing a standard DRAM, in which the recovery time for a full RAS cycle of standard DRAM (as shown in FIG. 1), assuming a speculative access and a miss, would be on the order of 80 to 100 ns. Another advantage of the present invention arises upon the occurrence of a speculative decode of the addresses, i.e., buffer and decode the row address and the redundant row address but still abort, as in never generating an RE2 strobe, then the DRAM 100 is available again to start a processing of an input address again on the order of about 6 ns. In the case of a standard DRAM, the only way to have fast access is to speculatively access the entire chip, thus the standard DRAM cannot again be available, once it is found out that the standard DRAM doesn't have the requested data, for about 100 ns.

In accordance with the present invention, the first row enable RAS input is activated before the DRAM tag memory controller 160 determines whether or not the desired data resides in the DRAM memory 100. As a result, in the instance in which the data does not reside in the DRAM 100 memory array 120, then only the DRAM row address and row decode circuits 112 and 114 must be reset. Resetting of the row address and row decode circuits can be done in less than a single processor cycle. Thus, a further advantage of the present invention is a much greater DRAM memory availability when only the first row enable RAS input 104 is speculatively activated and then reset.

The second word enable RE2 signal is generated from the memory controller 160 using known logic circuitry which is standard in the industry for generation of a traditional RAS strobe. That is, the logic circuitry searches a DRAM tag array or region descriptor to see if a particular address is present in the DRAM. The second word enable RE2 signal can be combined with other requests, say from the memory controller 160, for accessing the DRAM 100. In essence, the logic circuitry is looking at the DRAM tag array or region descriptor before issuing the second word enable RE2 signal on input 106 to facilitate an access of the DRAM 100 in accordance with the present invention.

The resultant DRAM 100 in accordance with the present invention has not one row enable input, but two row enable inputs 104 and 106, respectively. The two word enable inputs include the RAS input and the RE2 input, respectively. The first word enable RAS input 104 controls the addressing going to the row predecoder 112, thus effectively making the address ready at the input of the row driver circuit 118. However, the row driver circuit 118 will not be enabled until the second word enable RE2 signal is issued. As a result, the DRAM 100 is advantageously being prepared in advance for accessing a particular row of the array 120. However, the actual accessing of the array 120 does not occur until the second word enable RE2 signal is issued and received on input 106. Thus, a performance benefit is advantageously gained with respect to a speed of the DRAM 100 as used in a high speed cache application.

One key feature in the method and apparatus of the present invention is that, upon a system request for data by the memory controller 160, a row address is made available to the DRAM array 120, even before it is determined that the DRAM array 120 contains the desired data. A second word enable RE2 signal is issued upon a determination that requested data resides in the particular DRAM 100. The second word enable RE2 signal via input 106 activates the respective circuitry for a normal wordline drive, a redundant wordline drive, bitline sensing, and column decoding.

Figure 5:
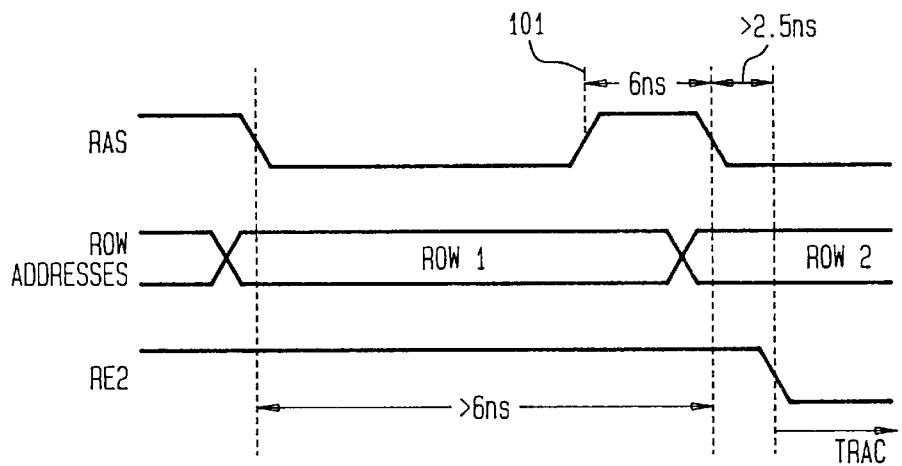
FIG. 5 is illustrative of a timing diagram of first word enable and second word enable signals in accordance with the present invention.

Referring to FIG. 5, a circuit simulator analysis has shown the potential $T_{rac}$ access improvement to be a significant improvement (that is, an access on the order of 2.5 ns) with respect to the use of the second word enable RE2 signal as compared to a simple row access of known stand-alone DRAM chips. When an access cycle is canceled (as indicated by reference numeral 101 in FIG. 5) and the second word enable RE2 signal is not activated, then the dual word enable DRAM chip 100 of the present invention will be available in 6 ns or less from receipt of the first word enable RAS signal as compared to 80–100 ns for a simple row access for a typical DRAM. An abort recovery is on the order of 6 ns or less.

Another advantage of the present invention is a lower power consumption for a speculative case, since a full array access does not occur in the event of a cache miss as discussed herein above.

Figure 6:
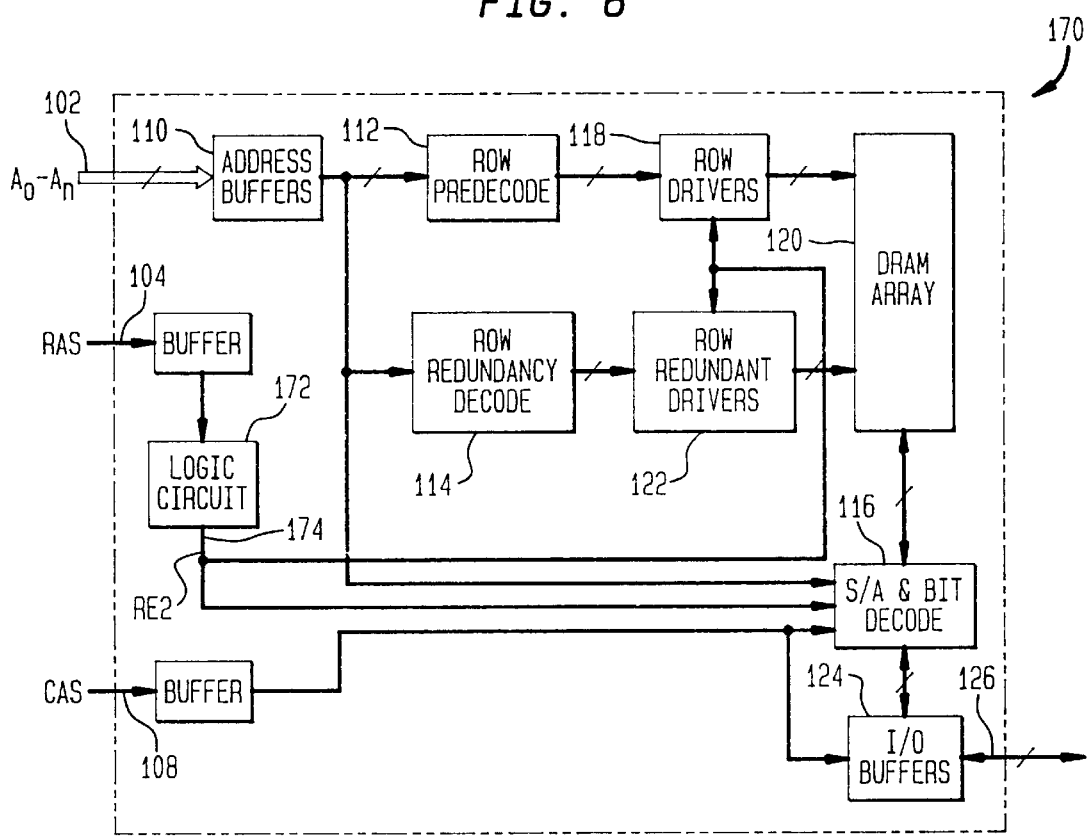
FIG. 6 shows a schematic representation of a stand-alone DRAM chip in accordance with a second embodiment of the present invention.

Turning now to FIG. 6, an alternate method and apparatus in accordance with the present invention is similar to the first embodiment except for the following difference. In the alternate embodiment as shown in FIG. 6, the decoders 112 and 114 are kept active all the time. The first word enable RAS signal is received at input 104 and routed through a determination logic circuitry 172 on the DRAM chip 170. The logic circuitry 172 is similar to that described with respect to the first embodiment, wherein the logic circuitry 172 issues the second word enable RE2 signal on line 174. Once again, FIG. 6, illustrates the second embodiment of the standalone dual word enable DRAM chip 170 according to the present invention having a dual row enable architecture. The dual row enable architecture in accordance with the present invention advantageously utilizes the row address data prior to a wordline activation for reducing access time from wordline activation. Furthermore, the dual word enable signals are used to enable an early processing of row address data.

The implementation of the present invention as shown in FIG. 3 requires a normal RAS strobe control input and an extra control input RE2. RAS has been referred to herein as the first word enable signal. RE2 has been referred to herein as the second word enable signal. The implementation of the alternate embodiment of the present invention as shown FIG. 6 incurs a slightly higher power consumption over the implementation of FIG. 3, however, the second embodiment may be an acceptable trade-off in terms of a further increased access time gained by the stand-alone DRAM chip 170 of the present invention.

The dual word (or late row) enable method and apparatus according to the present invention can also work well with multi-banked DRAMs. All banks of a multi-banked DRAM can be simultaneously activated up to, but not including, wordline activation. With a second row enable RE2 input control for each bank, the tag array DTAG result can be used to continue the rest of a desired row access for an appropriate bank only.

The present invention thus provides a word decoding scheme for memory arrays in which a performance improvement is achieved. That is, the present invention advantageously provides a faster array access time $t_{RAC}$ The present invention further provides for faster recovery of DRAM upon a canceled access, wherein a typical minimum DRAM cycle time $t_{RC}$ does not have to be satisfied prior to a subsequent DRAM chip access. Such advantages have been obtained through the use of two row access interface controls as discussed.

In accordance with the present invention, row address processing advantageously begins without activating the DRAM array, that is by withholding the second row enable RE2 signal input, as discussed with respect to FIG. 3. The embodiment shown in FIG. 6 can also achieve initiating row address processing without activating the DRAM array with ungated, static address buffering, row decoding, redundancy compare logic and a second row enable RE2 signal directly gating the word drivers. As a result, an early portion of a typical DRAM access can be terminated without an undesirable suffering of a full DRAM cycle time penalty. This is in contrast to conventional DRAMs. The present invention is highly applicable for use in merged logic/DRAM applications, in particular, where very fast DRAMs are used as caches. The present invention is further applicable as a DRAM replacement for SRAM caches.

The present invention presents a creative solution in to the problem of suffering a full DRAM cycle time penalty in a merged logic/DRAM application. The present invention saves on a number of logic gate delays encountered in accessing a DRAM memory array, on the order of about 10 stages (i.e., gate delays), and is greater when applied to a conventional DRAM architecture.

In one embodiment according to the invention, a second word enable RE2 signal is created to control the word drivers with gating based upon a determination of data valid. In another embodiment, a second word enable RE2 signal is used to trigger the word drivers in conjunction with static circuitry for the address true/compliment T/C and decode circuits that respond to address changes independent of the first word enable RAS signal and control logic, as discussed above, which controls the second word enable RE2 firing the word decoders. The impetus of the present invention is to increase DRAM performance, especially in a cache environment. A mere delaying of the firing of a RAS signal in a standard DRAM does not beget any performance improvement.

In the second embodiment of the present invention, a DRAM architecture is provided which allows an ungated, 'hot' address path through the word decode path. While a certain amount of power is consumed every time the address bus changes, a performance improvement for use in a cache environment is obtained.

The present invention advantageously inhibits a DRAM cycle through the use of the RAS clock, for avoiding a full DRAM cycle, as needed. In the cache application, a RAM memory device is included for providing the plurality of region descriptors in a directory, for example.

The benefit of the present invention is to obtain a faster access time of about 2.5 nanoseconds. This is accomplished by allowing the addresses to propagate through the first two functions for accessing the DRAM chip.

While the invention has been particularly shown and described with reference to specific embodiments thereof, it will be understood by those skilled in the art that various changes in form and detail may be made thereto, and that other embodiments of the present invention beyond embodiments specifically described herein may be made or practice without departing from the spirit and scope of the present invention as limited solely by the appended claims. For example, the dual word enable DRAM according to the present invention can be similarly utilized in a main system memory.

What is claimed is:

1. A method for memory data access in a dynamic random access memory (DRAM), said method comprising the steps of:

generating a plurality of address data signals for addressing a wordline of data stored in a DRAM memory array;

issuing a first row access strobe (RAS) signal to initiate a decoding of the address data signals in preparation for accessing a decoded wordline in the memory array; and issuing a second row access strobe (RE2) signal, wherein the RE2 signal is generated independently from the RAS signal, subsequent to the first RAS signal for driving the decoded address data into the memory array, thereby facilitating a dual row enable access of data in the memory array.

2. The method of claim 1, wherein the second row access strobe (RE2) signal is issued subsequent to the first RAS signal and after determining that data is present in the memory array.

3. A method for memory data access in a dynamic random access memory (DRAM), said method comprising the steps of:

receiving and decoding address inputs, the address inputs corresponding to an address of a wordline of data stored in a DRAM memory array, the receiving and decoding step decoding the address inputs in preparation for accessing a decoded wordline of data in the memory array;

generating a first word enable input for receiving a first row access strobe (RAS) signal; and generating a second word enable signal corresponding to a second row access strobe (RE2) signal, wherein the RE2 signal is generated independently from the RAS signal, and driving the decoded wordline address into the memory array, said RE2 signal generating step further including the step of determining whether or not the data is present in the memory array prior to generating the RE2 signal, thereby facilitating a dual word enable access of data in the memory array.

4. A dual word enable dynamic random access memory (DRAM) comprising:

a memory array;

means for receiving and decoding address inputs, the address inputs corresponding to an address of a wordline of data stored in said memory array;

means for driving a decoded wordline address into said memory array and accessing the decoded wordline of data;

a first word enable means for receiving a first row access strobe (RAS) signal and enabling a decoding of the address inputs by said address receiving and decoding means in response the RAS signal, further in preparation for accessing the decoded wordline of data in said memory array; and a second word enable means for receiving a second row access strobe (RE2) signal, wherein the RE2 signal is generated independently from the RAS signal, and enabling a driving of the decoded wordline address into the memory array by said driving and accessing means subsequent to receipt of the first RAS signal, thereby facilitating a dual word enable access of data in said memory array.

5. The dual word enable DRAM of claim 4, wherein said receiving and decoding means includes address buffers for receiving the address inputs, a row predecoder for receiving an output of the address buffers and decoding the address inputs, and a row redundancy decoder for receiving the output of the address buffers and decoding the address inputs in accordance with a prescribed redundancy decoding.

6. The dual word enable DRAM of claim 4, wherein said driving and accessing means includes a row driver coupled to said memory array for driving a desired wordline in accordance with the decoded wordline, a redundant row driver coupled to said memory array for driving a desired redundant wordline in accordance with the decoded wordline, and a sense amplifier and bit decoder for outputting a desired bit of a driven wordline.

7. The dual word enable DRAM of claim 4, wherein said second word enable means includes a logical AND gate, the logical AND gate having inputs for receiving the RAS signal and the RE2 signal and further for providing an output enable signal in accordance with the RAS signal and the RE2 signal, the output enable signal for enabling said driving and accessing means in accordance with the RAS signal and the RE2 signal.

8. The dual word enable DRAM of claim 4, wherein said receiving and decoding means includes address buffers for receiving the address inputs, a row predecoder for receiving an output of the address buffers and decoding the address inputs, and a row redundancy decoder for receiving the output of the address buffers and decoding the address inputs in accordance with a prescribed redundancy decoding, said driving and accessing means includes a row driver coupled to said memory array for driving a desired wordline in accordance with the decoded wordline, a redundant row driver coupled to said memory array for driving a desired redundant wordline in accordance with the decoded wordline, and a sense amplifier and bit decoder for outputting a desired bit of a driven wordline, and said second word enable means includes a logical AND gate, the logical AND gate having inputs for receiving the RAS signal and the RE2 signal and further for providing an output enable signal in accordance with the RAS signal and the RE2 signal, the output enable signal for enabling said driving and accessing means in accordance with the RAS signal and the RE2 signal.

9. A dual word enable dynamic random access memory (DRAM) comprising:

a memory array;

means for receiving and decoding address inputs, the address inputs corresponding to an address of a wordline of data stored in said memory array, said receiving and decoding means being enabled for decoding the address inputs in preparation for accessing a decoded wordline of the memory array;

means for driving the decoded wordline address into said memory array and accessing the decoded wordline of data;

a first word enable input means for receiving a first row access strobe (RAS) signal; and means responsive to the RAS signal for generating a second word enable signal, the second word enable signal corresponding to a second row access strobe (RE2) signal, wherein the RE2 signal is generated independently from the RAS signal, and wherein said driving and accessing means are enabled for driving the decoded wordline address into said memory array in response to the second RE2 signal, thereby facilitating a dual word enable access of data in the memory array.

10. The dual word enable DRAM of claim 9, wherein said RE2 signal generating means further includes means for determining whether or not the data is present in the memory array prior to generating the RE2 signal.

11. The dual word enable DRAM of claim 9, wherein said receiving and decoding means includes address buffers for receiving the address inputs, a row predecoder for receiving an output of the address buffers and decoding the address inputs, and a row redundancy decoder for receiving the output of the address buffers and decoding the address inputs in accordance with a prescribed redundancy decoding.

12. The dual word enable DRAM of claim 9, wherein said driving and accessing means includes a row driver coupled to said memory array for driving a desired wordline in accordance with the decoded wordline, a redundant row driver coupled to said memory array for driving a desired redundant wordline in accordance with the decoded wordline, and a sense amplifier and bit decoder for outputting a desired bit of a driven wordline.

13. The dual word enable DRAM of claim 9, wherein said RE2 signal generating means further includes means for determining whether or not the data is present in the memory array prior to generating the RE2 signal, said receiving and decoding means includes address buffers for receiving the address inputs, a row predecoder for receiving an output of the address buffers and decoding the address inputs, and a row redundancy decoder for receiving the output of the address buffers and decoding the address inputs in accordance with a prescribed redundancy decoding, and said driving and accessing means includes a row driver coupled to said memory array for driving a desired wordline in accordance with the decoded wordline, a redundant row driver coupled to said memory array for driving a desired redundant wordline in accordance with the decoded wordline, and a sense amplifier and bit decoder for outputting a desired bit of a driven wordline.

14. A cached memory system having a dual word enable dynamic random access memory (DRAM) comprising:

a memory array;

means for receiving and decoding address inputs, the address inputs corresponding to an address of a wordline of data stored in said memory array;

means for driving a decoded wordline address into said memory array and accessing the decoded wordline of data;

a first word enable means for receiving a first row access strobe (RAS) signal and enabling a decoding of the address inputs by said address receiving and decoding means in response to the RAS signal, further in preparation for accessing the decoded wordline of data in said memory array; and a second word enable means for receiving a second row access strobe (RES2) signal, wherein the RE2 signal is generated independently from the RAS signal, and enabling a driving of the coded wordline address into the memory array by said driving and accessing means subsequent to receipt of the first RAS signal, thereby facilitating a dual word enable access of data in said memory array.

15. The cached memory system of claim 14, wherein said receiving and decoding means includes address buffers for receiving the address inputs, a row predecoder for receiving an output of the address buffers and decoding the address inputs, and a row redundancy decoder for receiving the output of the address buffers and decoding the address inputs in accordance with a prescribed redundancy decoding.

16. The cached memory system of claim 14, wherein said driving and accessing means includes a row driver coupled to said memory array for driving a desired wordline in accordance with the decoded wordline, a redundant row driver coupled to said memory array for driving a desired redundant wordline in accordance with the decoded wordline, and a sense amplifier and bit decoder for outputting a desired bit of a driven wordline.

17. The cached memory system of claim 14, wherein said second word enable means includes a logical AND gate, the logical AND gate having inputs for receiving the RAS signal and the RE2 signal and further for providing an output enable signal in accordance with the RAS signal and the RE2 signal, the output enable signal for enabling said driving and accessing means in accordance with the RAS signal and the RE2 signal.

18. The cached memory system of claim 14, wherein said receiving and decoding means includes address buffers for receiving the address inputs, a row predecoder for receiving an output of the address buffers and decoding the address inputs, and a row redundancy decoder for receiving the output of the address buffers and decoding the address inputs in accordance with a prescribed redundancy decoding, said driving and accessing means includes a row driver coupled to said memory array for driving a desired wordline in accordance with the decoded wordline, a redundant row driver coupled to said memory array for driving a desired redundant wordline in accordance with the decoded wordline, and a sense amplifier and bit decoder for outputting a desired bit of a driven wordline, and said second word enable means includes a logical AND gate, the logical AND gate having inputs for receiving the RAS signal and the RE2 signal and further for providing an output enable signal in accordance with the RAS signal and the RE2 signal, the output enable signal for enabling said driving and accessing means in accordance with the RAS signal and the RE2 signal.

19. A cached memory system having a dual word enable dynamic random access memory (DRAM) comprising:

a memory array;

means for receiving and decoding address inputs, the address inputs corresponding to an address of a wordline of data stored in said memory array, said receiving and decoding means being enabled for decoding the address inputs in preparation for accessing a decoded wordline of the memory array;

means for driving the decoded wordline address into said memory array and accessing the decoded wordline of data;

a first word enable input means for receiving a first row access strobe (RAS) signal; and means responsive to the RAS signal for generating a second word enable signal, the second word enable signal corresponding to a second row access strobe (RE2) signal, wherein the RE2 signal is generated independently from the RAS signal, and wherein said driving and accessing means are enabled for driving the decoded wordline address into said memory array in response to the second RE2 signal, thereby facilitating a dual word enable access of data in the memory array.

20. The cached memory system of claim 19, wherein said RE2 signal generating means further includes means for determining whether or not the data is present in the memory array prior to generating the RE2 signal.

21. The cached memory system of claim 19, wherein said receiving and decoding means includes address buffers for receiving the address inputs, a row predecoder for receiving an output of the address buffers and decoding the address inputs, and a row redundancy decoder for receiving the output of the address buffers and decoding the address inputs in accordance with a prescribed redundancy decoding.

22. The cached memory system of claim 19, wherein said driving and accessing means includes a row driver coupled to said memory array for driving a desired wordline in accordance with the decoded wordline, a redundant row driver coupled to said memory array for driving a desired redundant wordline in accordance with the decoded wordline, and a sense amplifier and bit decoder for outputting a desired bit of a driven wordline.

23. The cached memory system of claim 19, wherein said RE2 signal generating means further includes means for determining whether or not the data is present in the memory array prior to generating the RE2 signal, said receiving and decoding means includes address buffers for receiving the address inputs, a row predecoder for receiving an output of the address buffers and decoding the address inputs, and a row redundancy decoder for receiving the output of the address buffers and decoding the address inputs in accordance with a prescribed redundancy decoding, and said driving and accessing means includes a row driver coupled to said memory array for driving a desired wordline in accordance with the decoded wordline, a redundant row driver coupled to said memory array for driving a desired redundant wordline in accordance with the decoded wordline, and a sense amplifier and bit decoder for outputting a desired bit of a driven wordline.

\* \* \* \* \*